D. LANE.
Head-Blocks for Saw-Mills.
No. 5,209. Reissued Dec. 31, 1872.
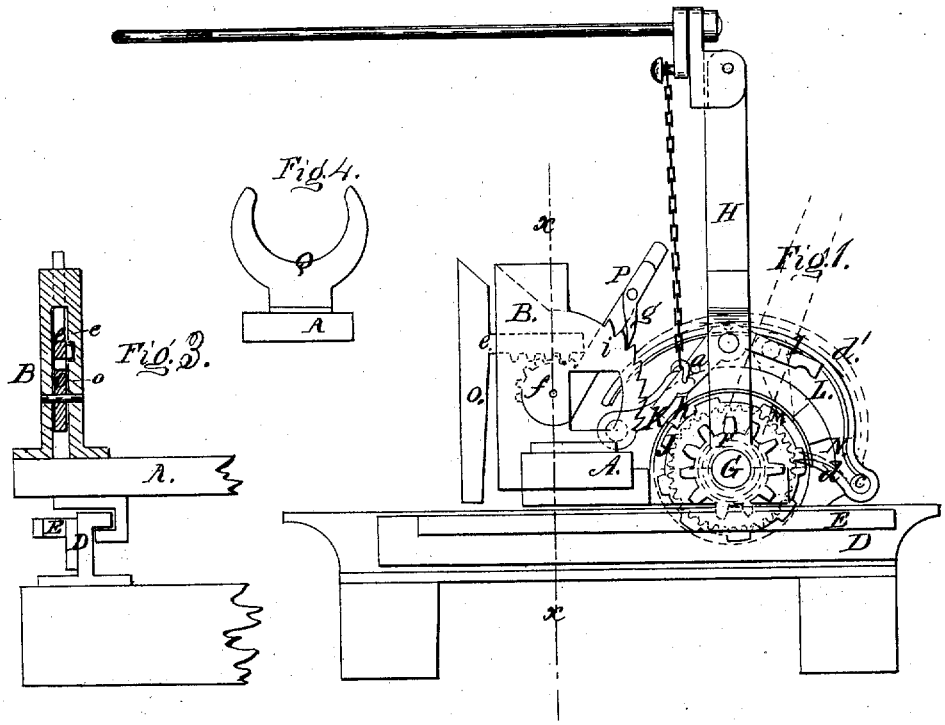
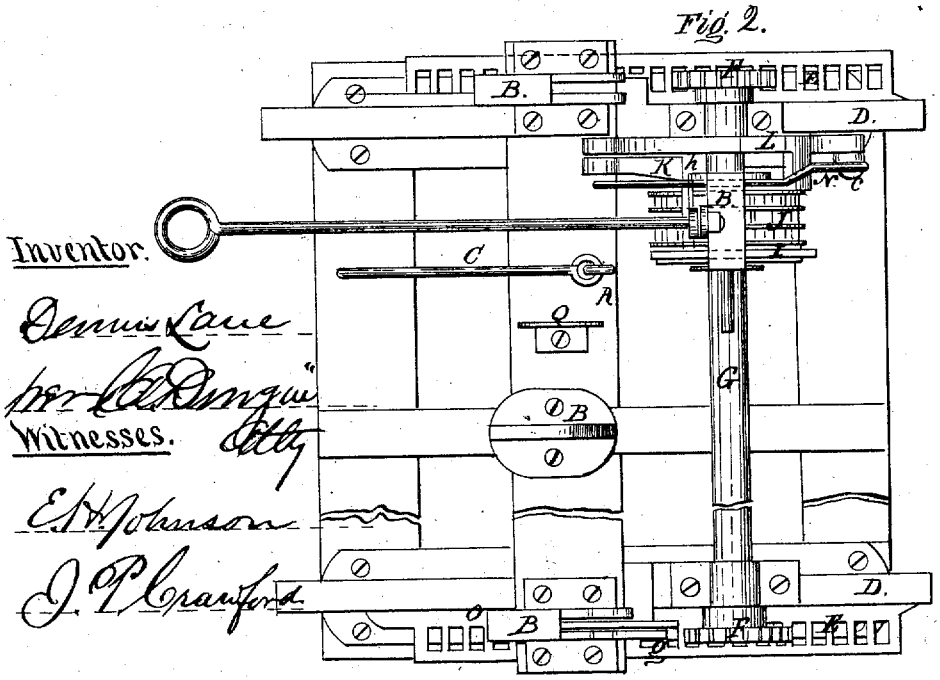
AM. PHOTO-LITHOGRAPHIC CO. N.Y. (OSBORNES PROCESS.)

UNITED STATES PATENT OFFICE.

DENNIS LANE, OF MONTPELIER, VERMONT.

IMPROVEMENT IN HEAD-BLOCKS FOR SAW-MILLS.

Specification forming part of Letters Patent No. 44,100, dated September 6, 1864; reissue No. 2,186, dated March 6, 1866; reissue No. 5,209, dated December 31, 1872.

*To all whom it may concern:*

Be it known that I, DENNIS LANE, of Montpelier, in the county of Washington and State of Vermont, have invented certain Improvements in Head-Blocks for Saw-Mill, of which the following is a specification:

*Nature and Objects of the Invention.*

Prior to my invention saw-mill carriages in which racks and pinions upon a setting-shaft have been used, so far as known to me, the shaft and pinions were stationary with only a rotary movement, and the racks reciprocated upon the carriage. These racks were necessarily quite long, extending back over the carriage and in the way, requiring additional room, and were liable to breakage and injury.

My said invention relates to circular-saw mill carriages; and consists in a novel combination and arrangement of parts, which are improvements in part upon the inventions patented to me July 9, 1861, and January 12, 1864; and have for their object to improve and facilitate the operation of saw-mills, as will be fully set forth hereafter.

*Description of the Drawing.*

Figure 1 is an end view of my invention. Fig. 2 is a plan or top view thereof. Fig. 3 is a section of a part of the same taken through the line X X, Fig. 1. Fig. 4 is a detached view of a fork belonging to the same.

Similar letters of reference indicate corresponding parts in the drawing.

*General Description.*

A represents a part of the carriage, having uprights B attached thereto, to which the log is secured by the dogs C. This carriage is arranged to work on parallel rails or ways D D, each of which has a rack, E, attached thereto at the outer side, as shown in Fig. 2. Into these racks E E pinions F F are arranged to work upon a shaft, G, the bearings of the shaft G being upon the carriage, as shown in Fig. 2. By turning the shaft G the carriage, with the log attached thereto, may be made to move to and fro, and the log set to the saw as desired. The shaft G is rotated by a lever, H, provided with a pawl, I, fitted thereon, which meshes into any one of a series of graduated ratchets, J, secured upon the shaft G, the construction and operation of which are fully described in the patent granted me July 9, 1861, to which reference is made. It will thus be seen that the carriage can be operated in any place sufficient to receive the ways or rails D D with the racks E E, whereas if the racks were moved in and out upon the carriage additional space would be required therefor and the racks exposed to breakage and injury. The advantages of my present method of construction will be obvious to all. The ratchet-wheels J are connected together upon the shaft G, and each one has teeth differing from the other, to vary the movement of the log by the setting-gear, as described. The pawl or dog I and lever H are adjustable so as to readily take either one of the ratchets J, and has a pin, *a*, passing transversely through it, which, when the setting-lever is drawn forward, comes in contact with a latch, K, when the latter is dropped forward on a bearing, *b*, which projects from a segment, L, on the carriage. This latch K, when adjusted, controls the throw of the lever H, and when it is thrown back full range is given thereto. M is a ratchet which is attached to one of the ratchets J, and has a dog, N, engaging therewith. This dog is of curved form, as shown in Fig. 1, and it is pivoted to the segment L at *c*, the short arm *d* being the dog proper, and the long part *d'* a sickle-shaped lever which projects in front of the ratchets J. This dog may be disengaged from the ratchet N by the pin *a* when the pawl I is adjusted to move back the carriage, and its office is to prevent any retrograde movement of the log. The upright B, at the end of the carriage opposite to that where the ratchets J work, has a vertical slide, O, fitted thereon, said slide having a rack-bar, *e*, projecting from its side at right angles, into which a toothed segment or pinion, *f*, on the end of a lever, P, works, and this lever has a dog or pawl, *g*, attached to it, which catches into segment ratchet-teeth upon the upright.

By this arrangement I employ but a single rack and pinion or toothed segment for adjusting the slide O to taper the log, whereas in my former invention, patented January 12, 1864, a double rack and two pinions were used.

Q is a fork which is attached vertically at such a point upon the carriage that it may receive and hold the dog C. One or more of these forks may be used, according to the number of dogs employed, and by their use the dogs are in position to be seized by the operator to adjust a log upon the carriage.

I am aware of Letters Patent No. 24,913, and disclaim said invention.

*Claims.*

1. The combination, with the log-rests B and a setting mechanism, of the stationary racks E, pinions F, and shaft G, arranged above the surface of the rests D, constructed and operating substantially in the manner described.

2. The dog N, combined with the ratchet M and pin *a* upon the pawl I, and so arranged that it may be engaged and disengaged with the ratchet by the setting-lever and its connection, substantially in the manner described.

3. The combination, with the segment L, of the latch K, pin *a*, and pawl I, to regulate the throw of the lever H, substantially in the manner described.

4. The combination, with the log-rests B, of the tapering device, consisting of the vertical slide O, segment *f*, lever P, pawl *g*, and segment-ratchet *i*, constructed and operating substantially in the manner described.

5. The combination, with the carriage A and hinged dog C, of the dog-rest Q, constructed substantially as and for the purposes described and specified.

Witnesses: DENNIS LANE.

C. A. DURGIN,

J. P. CRAWFORD.